(12) United States Patent
Pueschner et al.

(10) Patent No.: US 7,694,888 B2
(45) Date of Patent: Apr. 13, 2010

(54) METHOD FOR PRODUCING A CHIP CARD CONTACT ZONE

(75) Inventors: Frank Pueschner, Kehlheim (DE);
Wolfgang Schindler, Regenstauf (DE);
Peter Stampka, Burglengenfeld (DE)

(73) Assignee: Infineon Technologies AG, Neubiberg (DE)

( * ) Notice: Subject to any disclaimer, the term of this patent is extended or adjusted under 35 U.S.C. 154(b) by 808 days.

(21) Appl. No.: 11/560,058

(22) Filed: Nov. 15, 2006

(65) Prior Publication Data

US 2007/0148859 A1 Jun. 28, 2007

(30) Foreign Application Priority Data

Nov. 15, 2005 (DE) .................. 10 2005 054 418

(51) Int. Cl.
*G06K 19/06* (2006.01)
(52) U.S. Cl. ...................... 235/492; 438/259
(58) Field of Classification Search ........... 235/439, 235/441, 492; 438/259
See application file for complete search history.

(56) References Cited

U.S. PATENT DOCUMENTS

| 6,364,205 | B1 * | 4/2002 | Janczek et al. .......... 235/380 |
| 7,337,967 | B2 * | 3/2008 | Latka et al. ........... 235/454 |
| 2003/0226901 | A1 * | 12/2003 | Kim et al. ............ 235/492 |
| 2006/0043200 | A1 | 3/2006 | Puschner et al. |

FOREIGN PATENT DOCUMENTS

| DE | 196 30 049 A1 | 1/1998 |
| DE | 103 25 564 A1 | 12/2004 |
| JP | 01-210394 A | 8/1989 |
| JP | 05-286289 A | 11/1993 |
| JP | 2004-538586 A | 12/2004 |
| JP | 2005-502096 | 1/2008 |
| WO | WO-98/05000 A1 | 2/1998 |
| WO | WO-00/77496 A1 | 12/2000 |
| WO | WO-02/06835 A1 | 1/2002 |
| WO | WO-02/18155 A2 | 3/2002 |
| WO | WO-2003-016073 A1 | 2/2003 |
| WO | WO-2004/109591 A1 | 12/2004 |
| WO | WO-2005-096096 A1 | 10/2005 |

* cited by examiner

*Primary Examiner*—Seung H Lee
(74) *Attorney, Agent, or Firm*—Dickstein, Shapiro, LLP.

(57) ABSTRACT

A method for producing a contact zone for a chip card has the following steps. A sheet having a first surface and a second surface opposite the first surface. Forming at least one insulating trench, which extends from the first surface to the second surface. A cluster layer is applied to the first surface. The second surface is connected to a carrier element after the cluster layer has been applied to the first surface.

11 Claims, 1 Drawing Sheet

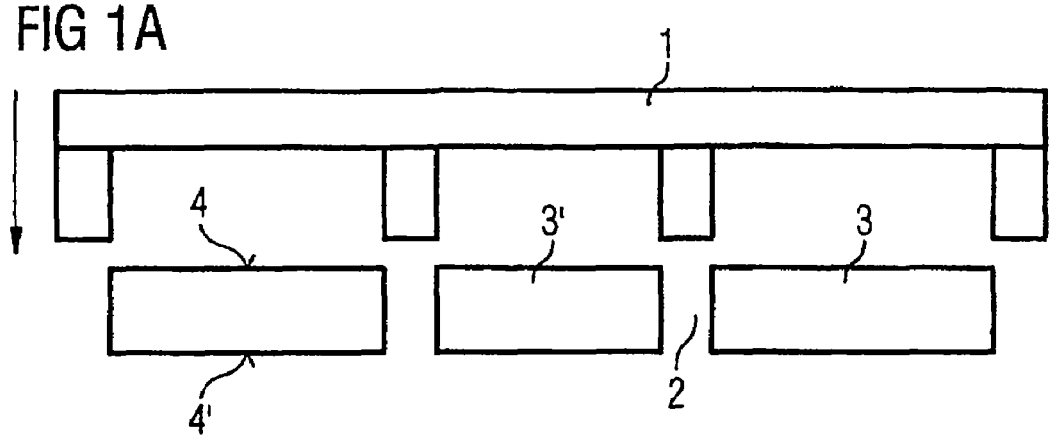
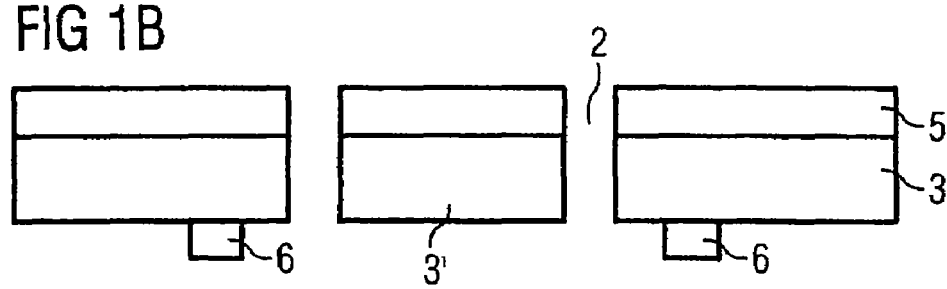
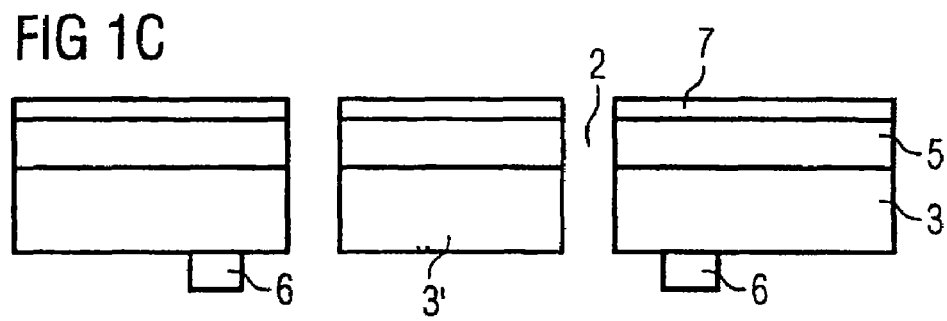
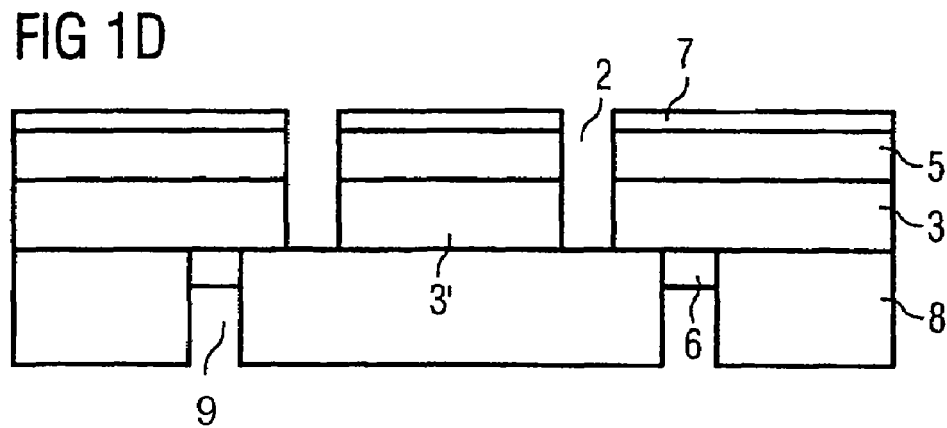

METHOD FOR PRODUCING A CHIP CARD CONTACT ZONE

CROSS REFERENCE TO RELATED APPLICATIONS

This application is a claims priority to German Patent Application No. 10 2005 054 418.5 filed Nov. 15, 2005, the entirety of which is incorporated herein by reference.

FIELD OF THE INVENTION

The invention relates to a method for producing a contact zone for a chip card.

BACKGROUND OF THE INVENTION

Chip cards have been known for a long time and are increasingly being used, for example, as telephone cards, identification cards or the like. There are standards which define the dimensions and technical details of such chip cards. These standards are, for example, ISO 7810 and ISO 7816.

Chip cards are currently divided into three categories, the contactless chip cards, the chip cards with contacts and the so-called combination cards. Both the chip cards with contacts and the combination cards have a contact zone that provides contacts in accordance with the above standards. The contacts are connected to a circuit that is integrated in the chip card. The arrangement of these contact areas on the chip card is clearly defined by the standards. The contact zones of the card contacts currently include a suitable metallic surface which is produced, for example, from gold, NiPdAg or similar materials. The individual contact areas are separated from one another in an insulating manner by means of separating channels.

The increasing importance of the chip cards is likewise associated with an increasing interest in preventing manipulation of the cards.

A conventional chip card module, for example, may include a carrier which has contact areas. Arranged opposite the contact areas on the carrier is a semiconductor chip having an integrated circuit which has connecting contacts on one surface of the chip, the connecting contacts being connected to associated contact areas in an electrically conductive manner. The contact areas may have a first conductive layer and a second conductive layer, cluster elements comprising metallic clusters being embedded in the second conductive layer. The random distribution of these cluster elements makes it possible to individualize the chip card, and detecting and storing the significant physical properties, which result from the cluster elements, in the chip make it possible to authenticate the module as such even before it is installed in a card.

SUMMARY OF THE INVENTION

A method for producing a contact zone for chip cards including:
providing a sheet having a first surface and a second surface opposite the first surface;
forming at least one insulating trench in the sheet, the at least one insulating trench extending from the first surface to the second surface;
applying a cluster layer to the first surface,
connecting the second surface to a carrier element after the cluster layer has been applied to the first surface, wherein the contact zone is defined by at least the at least one insulating trench.

BRIEF DESCRIPTION OF THE DRAWINGS

FIG. 1a-d show a sectional illustration for explaining one exemplary embodiment of the method for producing a contact zone for a chip card.

DETAILED DESCRIPTION OF THE INVENTION

An aspect of an embodiment of the invention is to provide a very simple method for producing contact areas for chip cards having properties which individualize and authenticate them.

A cluster layer is applied to a structured sheet before the sheet is connected to a carrier element. This avoids the cluster layer also being formed on the carrier element during its deposition and thus bridging the insulating trenches, which would result in the individual contact areas in the contact zone being short-circuited. The term cluster layer is a layer that is formed with cluster elements.

A first embodiment of the method according to the invention is when the sheet is electrically conductive. This makes it possible to establish a particularly simple electrical connection between the contact zone and a chip because the sheet is used as part of the electrical line. A copper leadframe is used for this purpose, for example.

Another embodiment of the method according to the invention provides for the first surface to be mirrored. As a result, incident light is reflected at the cluster elements of the cluster layer and at the first surface of the sheet. This reflection results in an individual optical detection feature for authenticating the finished chip card.

One development is when the sheet is structured by means of stamping. This makes it possible to structure the sheet in a rapid, cost-effective and reliable manner.

Another exemplary embodiment of the method according to the invention provides for a mirror layer to be applied to the first surface before the cluster layer is applied. A material, for example copper, whose surface needs to have considerably less efficient mirror properties can thus be used as the sheet. In addition, the additional mirror layer has a stabilizing effect on the entire structure. Nickel, for example, is suitable as a material for the mirror layer.

One advantageous development is when the cluster layer is applied by means of sputtering. As a result, the cluster layer can be generated in a rapid and cost-effective manner.

The invention will be explained in more detail below with reference to the figures.

FIG. 1a illustrates the first step of an exemplary embodiment of the method according to the invention. A stamping press 1 stamps the insulating trenches 2, which are needed to electrically insulate the individual contact areas 3' of an insulating contact zone, from a leadframe 3 using a downward movement. The leadframe 3 is produced from an electrically conductive metal, for example copper or CuSn6. However, other materials may also be used.

FIG. 1b illustrates another step of the method. In this case, an electrically conductive mirror layer 5 comprising nickel/gold, for example, is applied to the first surface 4 of the stamped leadframe 3. The deposition is effected, for example, by means of electroplating. However, other suitable deposition methods may also be used.

In addition, connecting contacts 6 are fitted at defined locations of the second surface 4' of the leadframe 3. This operation of fitting the connecting contacts 6 is likewise effected by means of electroplating and may be effected at the same time as the application of the mirror layer 5. The connecting contacts 6 are provided as contact areas for wiring, which is to be fitted later, between the contact areas 3' of the contact zone and a semiconductor chip.

FIG. 1*c* shows a subsequent step in which a cluster layer 7 is applied to the mirror layer 5. The application is effected, for example, by means of sputtering. In this case, the insulating trenches 2 are not bridged and remain open.

FIG. 1*d* shows a subsequent step in which the stamped leadframe 3, which has the mirror layer 5 applied to it and the cluster layer 7 applied to the latter, is connected to a carrier element 8 comprising epoxy material, for example. The connection is effected, for example, by laminating the second surface 4' of the leadframe 3 to the carrier element 8.

The carrier element 8 has openings 9. The leadframe 3 is aligned on the carrier element 8 in such a manner that the connecting contacts 6 lie in the openings 9. A semiconductor chip (not illustrated) can thus be connected, through the openings 9, to the connecting contacts 6 on the rear side of the carrier element 8 with the aid of wires.

As an alternative, through-plating would also be possible by filling the openings 9 with a conductive material in order to establish an electrical connection between the leadframe 3 and a semiconductor chip (not illustrated) on the rear side of the carrier element 8.

What is claimed is:

1. A method for producing a contact zone for a chip card, said method comprising:
    providing a sheet having a first surface and a second surface opposite the first surface;
    forming at least one insulating trench in the sheet, the at least one insulating trench extending from the first surface to the second surface;
    applying a cluster layer to the first surface; and
    connecting the second surface to a carrier element after the cluster layer has been applied to the first surface, wherein the contact zone is defined by at least the at least one insulating trench.

2. The method of claim 1, wherein the sheet is electrically conductive.

3. The method of claim 1, wherein the first surface is optically mirrored.

4. The method of claim 1, wherein the step of forming further comprises stamping.

5. The method of in claim 1, further comprises applying a mirror layer to the first surface before the cluster layer is applied.

6. The method of claim 1, wherein the step of applying the cluster layer further comprises sputtering.

7. A method for producing a contact area for a chip card, said method comprising:
    providing a metal film having a first surface and a second surface opposite the first surface;
    forming insulating trenches in the metal film extending from the first to the second surface to form contact areas in the metal film, wherein adjacent edges of contact areas are separated by the insulating trenches;
    applying a cluster layer to the first surface; and
    connecting the second surface to a carrier element after the cluster layer has been applied to the first surface.

8. The method in claim 7, wherein the first surface is optically mirrored.

9. The method in claim 7, wherein the step of forming further comprises stamping.

10. The method in claim 7, further comprising applying a mirror layer to the first surface before the cluster layer is applied.

11. The method as claimed in claim 7, wherein the step of applying the cluster layer further comprises sputtering.

* * * * *